United States Patent [19]

Kennan et al.

[11] Patent Number: 5,008,305

[45] Date of Patent: * Apr. 16, 1991

[54] TREATED SILICA FOR REINFORCING SILICONE ELASTOMER

[75] Inventors: Linda D. Kennan; Theodore L. Knapp; Carl M. Monroe; Olgerts Skostins, all of Midland, Mich.

[73] Assignee: Dow Corning Corporation, Midland, Mich.

[*] Notice: The portion of the term of this patent subsequent to Jan. 15, 2008 has been disclaimed.

[21] Appl. No.: 306,193

[22] Filed: Feb. 6, 1989

[51] Int. Cl.$^5$ .................................................. C08K 9/06
[52] U.S. Cl. ..................................... 523/212; 106/490; 428/405; 564/588; 564/860
[58] Field of Search ...................... 106/490; 523/212; 428/405; 524/588, 860

[56] References Cited

U.S. PATENT DOCUMENTS

| | | | |
|---|---|---|---|
| 2,993,809 | 7/1961 | Bueche et al. | 117/100 |
| 3,024,126 | 3/1962 | Brown et al. | 106/308 |
| 3,128,196 | 4/1964 | Pierpoint et al. | 106/308 |
| 3,635,743 | 1/1972 | Smith | 106/288 |
| 3,677,784 | 7/1982 | Nitche | 106/490 |
| 3,847,848 | 11/1974 | Beers | 260/18.5 |
| 3,920,865 | 11/1975 | Laufer et al. | 427/220 |
| 3,929,718 | 12/1975 | Kratee et al. | 260/37 SB |
| 4,111,890 | 9/1978 | Getson et al. | 260/37 SB |
| 4,164,509 | 8/1979 | Laufer | 260/448.8 R |
| 4,454,288 | 6/1984 | Lee et al. | 524/568 |
| 4,724,167 | 2/1988 | Evans et al. | 427/221 |

FOREIGN PATENT DOCUMENTS

| | | |
|---|---|---|
| 1951620 | 5/1971 | Fed. Rep. of Germany . |
| 2513608 | 10/1976 | Fed. Rep. of Germany . |
| 682574 | 11/1952 | United Kingdom . |
| 1371218 | 10/1974 | United Kingdom . |

OTHER PUBLICATIONS

"Ammonia-Catalyzed Silylation Reactions of Cab-O--Sil with Methoxymethylsilanes", JACS, 109, (23), p. 7141 (1987).

*Primary Examiner*—John C. Bleutge
*Assistant Examiner*—R. Dean, Jr.
*Attorney, Agent, or Firm*—Edward C. Elliott

[57] ABSTRACT

An improved reinforcing silica filler can be produced by treating a reinforcing silica, having a surface area of greater than 50 m$^2$/g and from 0.5 to 6 parts by weight of adsorbed moisture per 100 parts by eight of silica, with a volatile treating agent comprising a combination of from 0.2 to 10 parts by weight of volatile treating agent of the formula Vi$_x$Si(OR')$_{4-x}$ and from 0.2 to 15 parts by weight of volatile treating agent of the formula Ph$_x$Si(OR')$_{4-x}$, where Vi is vinyl radical and Ph is phenyl radical. The improved reinforcing silica filler can be combined with polydiorganosiloxane and curing means to produce silicone elastomer compositions which can be cured to elastomers which have improved physical properties, such as compression set and heat aging.

11 Claims, No Drawings

TREATED SILICA FOR REINFORCING SILICONE ELASTOMER

BACKGROUND OF THE INVENTION

1. Field of the Invention

This invention relates to the treatment of reinforcing silica filler for use in silicone elastomer.

2. Background Information

A method for making treated silica fillers is taught in U.S. Pat. No. 2,993,809, issued Jul. 25, 1961. Newly formed fumed silica, while at a temperature below 500° C. is contacted with an organohydrolyzable silane. The silica is formed by combustion of silicon tetrachloride in the presence of hydrogen and oxygen, the amount of hydrogen being in excess so as to form sufficient water to convert all the silicon-bonded chlorine atoms in the silicon tetrachloride to silanol groups and to effect hydrolysis of the organohydrolyzable silane.

A method of treating reinforcing silica is taught in U.S. Pat. No. 3,024,126, issued Mar. 6, 1962. The method disperses a silica in an organic solvent and adds an organosilicon compound having hydroxyl or alkoxy radicals. There is also present a compound compatible with the solvent and selected from the group consisting of an amino compound having a basic dissociation constant in dilute solution in water of at least $10^{-7}$ at 25° C., a quaternary hydrocarbon-substituted ammonium hydroxide, a salt of a phosphoric acid, and a salt of a carboxylic acid. Included are such materials as ammonia, certain organic amines, and silylorganic amines, such as $[Me_3Si(CH_2)_n]CHNH_2$.

Silica is surface modified in U.S. Pat. No. 3,128,196, issued Apr. 7, 1964, by preferably fluidizing the silica and injecting a mixture of a liquid cyclic silane and a phenyl containing organosilicone compound having alkoxy groups.

Offenlegungsschrift 1,951,620, publication date of May 6, 1971, discloses a process for preparing hydrophobic, finely divided silicon dioxide. The process reacts silicon dioxide with from 1 to 10 percent by weight organoalkoxysilanes in the presence of amino compounds, the silane and amino compound being in the gaseous state at least a major portion of the reaction time, the reaction time typically being greater than 10 days.

An improved reinforcing silica filler is taught in U.S. Pat. No. 3,635,743, issued Jan. 18, 1972, as being made by first treating a reinforcing silica filler with ammonia and then with hexamethyldisilazane. The process claimed requires the silica to contain at least 0.2 weight percent of adsorbed water at the beginning of treating. The ammonia can be replaced with primary amines and aminoxy compounds, and the hexamethyldisilazane with other silylamines and disilazanes.

British Application No. 1,371,218, published Oct. 23, 1974, and U.S. Pat. No. 4,164,509, issued Aug. 14, 1979, teach a process for hydrophobizing finely divides oxides. For example, a silicon oxide, having a water content of less than 1 percent by weight is intensively mixed, as in a fluidized bed, with a hydrolyzable metal or metalloid compound of the general formula $M(OR)_4$, where M can be silicon. The oxide can be treated with dry ammonia gas before, during, or after the mixing of the oxide with the ester compound.

A specially treated filler is used in a two-part room temperature vulcanizable silicone rubber composition described in U.S. Pat. No. 3,847,848, issued Nov. 12, 1974. The filler is prepared by intimately contacting silica filler, containing from 0.2 to 2.0 percent by weight of moieties selected from water, hydroxyl groups, and mixtures thereof, with a hydroxyl amine, a cyclic siloxane, and a silyl nitrogen compound of the formula $(R^4{}_3Si)_aX$, where X is a nitrogen containing group. Preferably the treatment is carried out at a temperature of from 100° to 180° C., while the filler is being continuously agitated.

A process for hydrophobizing highly dispersed metal or metalloid oxides is described in U.S. Pat. No. 3,920,865, issued Nov. 18, 1975. After drying the particles as a fluidized bed at a temperature of 600° to 1000° C. the dried particles are charged with at least one gas-phase organosilicon compound at a temperature of from 25° to 650° C., reacted at a temperature of from 35° to 650° C., and heated to from 125° to 500° C.

A filler which is subjected to mechanical stress and reacted with an organosilicon compound of the formula $(R_3Si)_aZ'$ is described in U.S. Pat. No. 3,929,718, issued Dec. 30, 1975. R is a monovalent hydrocarbon radical or substituted monovalent hydrocarbon radical having up to 18 carbon atoms. $Z'$ is a halide, hydrogen or a radical of the formula OH, OR', NR'X, ONR'$_2$, SR', OOCR', O, N(CX), or S where R' is an alkyl or aryl radical and X is hydrogen or R'. Other organosilicon compounds which can be reacted are dimethyldichlorosilane, dimethyldiethoxysilane, diphenyldiethoxysilane, vinylmethyldimethoxysilane, octamethylcyclotetrasiloxane and/or dimethylpolysiloxanes having from 2 to 12 silicon atoms per molecule and having an Si-bonded hydroxyl group on each of the terminal units. The treated filler is used in organopolysiloxane elastomers.

U.S. Pat. No. 4,111,890, issued Sept. 5, 1978, contains a discussion of fillers suitable in curable organopolysiloxane compositions containing titanium esters. Included are treated fumed silicas, as well as other metallic oxides. It is preferred that the fillers be treated with organosilicon compounds to impart hydrophobic properties thereto. Organosilicon compounds which may be used are those having the general formula $(R'''{}_3Si)_eZ$ or $R'''{}_{e'}SiZ'_{4-e'}$ wherein $R'''$ which may be the same or different represents monovalent hydrocarbon radicals and halogenated monovalent hydrocarbon radicals, Z and $Z'$ represent halogen, hydrogen, or a radical of the formula—OR'''', —NR''''X', —ONR'''', —SR'''', or —OOCR'''' and when e is 2, then Z may also represent —O—, —NX'—, or —S—; R'''' is a hydrocarbon radical or a substituted hydrocarbon radical, X'' is hydrogen or has the same meaning as R''''; e is 1 or 2, and e' is 1,2, or 3.

A method of surface treating particulate inorganic fillers with a surface-treating agent is taught in U.S. Pat. No. 4,454,288, issued Jun. 12, 1984. The surface treating agent is an equilibrated reaction mixture consisting essentially of a specified ratio of $R_2SiO_{2/2}$ units, $RSiO_{3/2}$ units, and $CH_3O_{1/2}$ radicals. When reinforcing silica filler is treated in such a method, it is useful with polydiorganosiloxanes curable to elastomers.

Blitz, Murphy, and Leyden teach in an article "Ammonia-Catalyzed Silylation Reactions of Cab-O-Sil with Methoxymethylsilanes", JACS, 109, (23) 7141 (1987) that ammonia can be used to catalyze the reactions of methoxymethylsiloxanes with fumed silica in dry toluene medium. High temperature post-reaction curing is unnecessary for silylation to occur in either "dry" or "wet" Cab-O-Sil.

In U.S. patent application Ser. No. 193,626, filed May 13, 1988, assigned to the same entity as the instant application, Collins et al. teach a method consisting essentially of mixing reinforcing silica with a volatile treating agent of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 0.005 atmosphere at treatment temperature, in combination with a volatile catalyst selected from the group consisting of acid A, base B, and mixtures thereof; wherein acid A is a volatile acid or acid progenitor, and base B is a silylamine or silazane, acid A and base B being chosen so that the vapor pressure of either acid A or base B exceeds 0.005 atmosphere at treatment temperature, for a period of time sufficient to allow the desired amount of treating agent to be adsorbed onto the surface of the particulate filler. The method of this invention is an improvement over the method taught by Collins et al.

SUMMARY OF THE INVENTION

An improved reinforcing silica is produced when silica having a surface area of greater than 50 $m^2/g$ and from 0.5 to 6 parts by weight of adsorbed moisture per 100 parts of silica is treated by mixing 100 parts by weight of silica with from 1 to 30 parts by weight of volatile treating agent. The volatile treating agent is of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 0.0001 atmosphere at treatment temperature. The volatile treating agent is further restricted in that it comprises a combination of from 0.2 to 10 parts by weight of volatile treating agent of the formula $Vi_xSi(OR')_{4-x}$ and from 0.2 to 15 parts by weight of volatile treating agent of the formula $Ph_xSi(OR')_{4-x}$, where Vi is vinyl radical and Ph is phenyl radical, for a period of time sufficient to allow the desired amount of treating agent to be adsorbed onto the surface of the particulate filler.

It is an object of this invention to produce a reinforcing silica which can be used to reinforce silicone elastomeric compositions which can be manufactured without the use of expensive additives which are used to improve the physical properties of the cured silicone elastomer.

DESCRIPTION OF THE INVENTION

This invention relates to an improved reinforcing silica filler having a surface area of greater than 50 $m^2/g$, said surface having been treated by mixing 100 parts by weight of silica, having from 0.5 to 6 parts by weight of adsorbed moisture, with a treating mixture comprising from 1 to 30 parts by weight of volatile treating agent of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane equals or exceeds 0.0001 atmosphere at treatment temperature, for a period of time sufficient to allow the desired amount of treating agent to be adsorbed onto the surface of the particulate filler, wherein the volatile treating agent comprises a combination of from 0.2 to 10 parts by weight of volatile treating agent of the formula $Vi_xSi(OR')_{4-x}$ and from 0.2 to 15 parts by weight of volatile treating agent of the formula $Ph_xSi(OR')_{4-x}$, where Vi is vinyl radical and Ph is phenyl radical.

This invention also relates to a method of producing such a reinforcing filler wherein in a method of rapidly treating the surface of reinforcing silica filler consisting essentially of mixing, at a temperature of from about $-10°$ to $130°$ C., (A) 100 parts by weight of reinforcing silica filler, having a surface area of greater than 50 $m^2/g$, and having from 0.5 to 6 parts by weight of adsorbed moisture, (B) from 1 to 30 parts by weight of volatile treating agent of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 0.0001 atmosphere at treatment temperature, (C) from 0.001 to 5.0 parts by weight of volatile catalyst selected from the group consisting of acid A, base B, and mixtures thereof, wherein acid A is a volatile acid or acid progenitor, and base B is a silylamine or silazane, acid A and base B being chosen so that the vapor pressure of either acid A or base B exceeds 0.005 atmosphere at treatment temperature, for a period of time sufficient to allow the desired amount of treating agent to be adsorbed onto the surface of the particulate filler, the improvement consisting of the use of volatile treating agent comprising a combination of from 0.2 to 10 parts by weight of volatile treating agent of the formula $Vi_xSi(OR')_{4-x}$, and from 0.2 to 15 parts by weight of volatile treating agent of the formula $Ph_xSi(OR')_{4-x}$, where Vi is vinyl radical and Ph is phenyl radical, to yield a filler which requires a minimum of energy to disperse rapidly into polydiorganosiloxane and which gives improved properties to cured silicone elastomers.

Silicone elastomers consist essentially of polydiorganosiloxane reinforced with filler. The polydiorganosiloxane ordinarily contains a small amount of hydroxyl radical left from the method of manufacture. The polydiorganosiloxane is transformed from a fluid or gum into an elastomer by crosslinking, either through the addition of a crosslinking agent or through the formation of crosslinks between the radicals present on the polymer chain, both in the presence of a catalyst. The elastomer formed is very weak mechanically when compared to the common organic elastomeric materials. The silicone elastomers are commonly improved by the addition of reinforcing and extending fillers to modify their physical properties. A well known method of improving the physical strength of silicone elastomers is through the addition of reinforcing silica fillers. In order to act as reinforcing agents, the particles of filler need to be very small, the most common method of designating the particle size is by stating the surface area of the particles, stated as square meters of surface per gram of filler. The useful lower limit of reinforcing filler for polydiorganosiloxane is commonly agreed to be about 50 $m^2/g$. The most common filler for silicone elastomer is silica, both fumed silica and precipitated silica, with fumed silica preferred as it normally has a lower moisture content.

When these finely divided reinforcing fillers are mixed into polydiorganosiloxane, there is a reaction between the two which results in a thickening of the mixture. In the case of polymers of gum viscosity, the thickening can result in a mixture which is difficult to further process. This process, known as crepeing, has been prevented to a lesser or greater degree through the use of process aids, such as low viscosity hydroxyl endblocked polydimethylsiloxane, added at the time of the addition of the filler to the polymer. The filler has also been treated before use, usually with a silane, in an attempt to prevent the crepeing reaction. The method of this invention results in a treated filler which is very easy to mix into the polymer and yields a mixture which has a reduced tendency to crepe. When the improved reinforcing silica filler of this invention in used to produce silicone elastomer base by mixing with polydiorganosiloxane, it is not necessary to use many of the additives presently used in such compositions to modify the properties obtained upon curing of the composition. An example is the use of vinyl containing low molecular weight polydiorganosiloxane additives which are added to obtain a lower compression set in the cured elastomer. When the treated filler of this invention is used to produce the composition, it is not necessary to add the vinyl containing polydiorganosiloxane.

The reinforcing silica filler (A) used in the method of this invention is a well known, commercial material. The method of producing the filler is not critical, both precipitated and fumed fillers are suitable. The preferred filler is fumed silica, since it is readily available in commercial quantities.

These finely divided fillers adsorb water on their surface if they are exposed to the air. For example, a fumed silica stored at room conditions of 23° C. and 50% relative humidity, having a surface area of about 250 m$^2$/g, will contain about 2 percent of moisture on its surface. The method of this invention does not require that the surface of the filler be without moisture, or that the amount of moisture be at an exact level, as long as some moisture is present to hydrolyze the treating agent. A practical lower limit is about 0.5 percent by weight, while a practical upper limit is about 6 percent by weight. When more than about 6 percent moisture is present, at least in the case of fumed silica, the filler tends to form clumps and is more difficult to disperse.

The volatile treating agent used in the method of this invention comprises a combination of from 0.2 to 10 parts by weight of volatile treating agent of the formula $Vi_xSi(OR')_{4-x}$ and from 0.2 to 15 parts by weight of volatile treating agent of the formula $Ph_xSi(OR')_{4-x}$, where Vi is vinyl radical, Ph is phenyl radical, and R' is an alkyl radical having from 1 to 3 carbon atoms, x is 1 or 2, and R' is chosen so that the vapor pressure of the alkoxysilane combination exceeds 0.0001 atmosphere at treatment temperature. The combination can optionally also contain volatile treating agent of the formula $R_xSi(OR')_{4-x}$, wherein R is a substituted or unsubstituted, saturated or unsaturated, alkyl or aryl radical having from 1 to 6 carbon atoms, R' is an alkyl radical having from 1 to 3 carbon atoms, x is 1 or 2, and R and R' are chosen so that the vapor pressure of the alkoxysilane exceeds 0.0001 atmosphere at treatment temperature. R represents radicals such as methyl (Me), ethyl (Et), propyl, hexyl, vinyl, and 3,3,3-trifluoropropyl. R' represents methyl, ethyl, and propyl radicals. Preferred treating agents are ViSi(OMe)$_3$ (vinyltrimethoxysilane), PhSi(OMe)$_3$ (phenyltrimethoxysilane), MeSi(OMe)$_3$ (methyltrimethoxysilane) and Me$_2$Si(OMe)$_2$ (dimethyldimethoxysilane). The preferred treating agents can be used at room temperature since their vapor pressures are 0.012 atmosphere for ViSi(OMe)$_3$ (vinyltrimethoxysilane), 0.0001 for PhSi(OMe)$_3$ (phenyltrimethoxysilane), 0.035 atmosphere for MeSi(OMe)$_3$ (methyltrimethoxysilane) and 0.064 atmosphere for Me$_2$Si(OMe)$_2$ (dimethyldimethoxysilane) all at 20° C.

The amount of treating agent used can vary from 1 to 30 parts by weight, based upon 100 parts by weight of the filler. For fumed silica as the filler, a preferred amount is from 3 to 20 parts by weight, and a more preferred from 5 to 12 parts by weight. The optimum amount of treating agent used is determined as follows. The selected filler is treated with a range of amounts and ratios of the combination of treating agent, as well as a range of catalyst amounts. The treated filler samples are then used to prepare samples of the desired final product and the properties of the final product are evaluated. A comparison of the resulting properties indicates the optimum level and ratios of the separate treating agents and catalyst to use in the combination of treating agents used in this invention. It has been determined that the amount of volatile treating agent of the formula $Vi_xSi(OR')_{4-x}$ is between 0.2 and 10 parts by weight per 100 parts by weight of silica, with a preferred level of from 0.5 to 6 parts by weight. It has also been determined that the amount of volatile treating agent of the formula $Ph_xSi(OR')_{4-x}$ is between 0.2 and 15 parts by weight per 100 parts by weight of silica, with a preferred level of from 1 to 10 parts by weight. The examples of this application show such procedures. Filler treated according to this invention shows improved properties in the cured silicone elastomer made from the treated filler. In the case of high consistency silicone rubber stocks, an additional benefit is seen in the fact that a given durometer cured rubber can be produced with significantly lower fumed silica content, resulting in a more economical product than can be produced when using untreated filler.

The treatment of the reinforcing silica filler surface can be catalyzed by from 0.001 to 5.0 parts by weight of a volatile catalyst. A preferred amount is from 0.001 to 2 parts. The volatile catalyst is selected from the group consisting of base B and mixtures of acid A and base B; wherein acid A is a volatile acid or acid progenitor, and base B is a silylamine or silazane, acid A and base B being chosen so that the vapor pressure of either acid A or base B exceeds 0.005 atmosphere at treatment temperature. A volatile acid or base is defined as that having the required vapor pressure. The acid A can be any acid or acid progenitor having the required volatility, preferred are catalysts selected from the group consisting of hydrogen chloride (HCl), hydrogen bromide (HBr), methyltrichlorosilane (MeSiCl$_3$), and dimethyldichlorosilane (Me$_2$SiCl$_2$). An acid progenitor is defined as a material that gives an acid when it contacts water or water vapor. Most preferred are methyltrichlorosilane and dimethyldichlorosilane. The base B can be a silylamine or silazane selected from the group consisting of (R''$_3$Si)$_2$NR, (R''$_3$Si)$_2$NH, R''$_3$SiNR''$_2$, and R''$_3$SiNHR'', where R'' is the same as R' and is an alkyl radical having from 1 to 3 carbon atoms. Most preferred is hexamethyldisilazane (Me$_3$Si)$_2$NH. Mixtures of catalysts can also be used. The most preferred catalysts can be used at room temperature because their vapor pressures at 20° C. are 0.18 atmosphere for methyltrichlorosilane, 0.15 atmosphere for dimethyldichlorosilane, and 0.25 atmosphere for trimethylchlorosilane, and 0.026 atmosphere for hexamethyldisilazane.

The acid (A) and base (B) are well known materials as to the means of manufacture. The base (B) silazanes can also be produced by an in situ process where, for example, a chlorosilane, such as dimethyldichlorosilane, and an amine, such as ammonia, are added to the filler and allowed to react to give a silazane.

The method of this invention makes use of a gaseous treatment of the particulate filler. The treating agent and the catalyst are both of sufficient volatility at the treatment temperature to create an atmosphere in the treating chamber which contains sufficient treating agent and catalyst to treat the filler surface. The preferred method of treatment stirs the filler in a container whose contents can be agitated and purged with an inert gas. The effect can be obtained by circulating a gas through the bed at a sufficient rate to fluidize the filler, or through rapid stirring or tumbling. The treating agent and catalyst are preferably added to the container by spraying onto the filler surface while the filler is being fluidized or agitated. The temperature at which the treatment takes place is determined by the treating agent and catalyst used. In most cases room temperature, defined herein as 10° C. to 30° C., is satisfactory. If a higher boiling treating agent, such as diphenyldimethoxysilane, is used, the treatment temperature must be raised so that the concentration of treating agent in the fluidized bed is sufficient to adequately treat the filler. An upper temperature of 130° C. is sufficient when using the treating agents and catalyst specified in this invention.

The treating agent and catalyst, if used, can be added to the mixing chamber in any order, but the preferred order is first adding the filler and fluidizing it by stirring or use of a fluidized bed device, then adding the treating agent and catalyst, if used.

It is not necessary to further process the treated filler after the method of this invention to remove excess reactants, because only an amount of the catalyst and treating agent are added to the mixture at the time of the treatment process to give the desired properties. The small amounts of treating agent and catalyst used and the short time of treatment gives a treated filler with a minimum cost.

The usefulness and uniqueness of the filler resulting from the method of this invention can be shown by adding it to polydiorganosiloxane and comparing the product resulting (herein referred to as a base) with a similar product produced with untreated filler or filler not treated in accordance with this invention.

The polydiorganosiloxane used to combine with the treated filler of this invention to make a silicone composition, commonly referred to as a base, is a well known article of commerce. The organic groups are most usually methyl, with small amounts of vinyl and phenyl groups added to the polymer to provide specific properties in the cured elastomer. Solvent resistance can be obtained by use of 3,3,3-trifluoropropyl radical in the polymer. The polymer is usually of greater than 50,000 molecular weight in the case of fluid polymers up to gums having molecular weights of 1,000,000 and higher in the case of the high consistency products. Compositions of fluid viscosity are often cured by the addition of a curing system based upon the platinum catalysis of a vinyl containing polymer and a crosslinking agent containing hydrogen attached to silicon. Most often, the high consistency compositions, having viscosties of greater than 1000 Pa.s at 25° C., are cured through the use of organic peroxides as free radical production catalysts which cause reactions between the organic radicals on the polymer to produce crosslinks.

The usefulness of the treated filler produced by the method of this invention and comparisons to other treated and untreated fillers is best demonstrated by a series of examples. The following examples are used to show the uniqueness of the treated filler of this invention. The discussion of the comparisons is found in the discussion of the examples and the results obtained.

The following examples are included for illustrative purposes only and should not be construed as limiting the invention which is properly set forth in the appended claims. All parts are parts by weight.

EXAMPLE 1

An improved reinforcing silica filler which falls under the claims of this invention was prepared by adding 100 parts of silica having a surface area of about 250 m$^2$/g into a Neulinger mixer. A mixture of 2 parts of vinyltrimethoxysilane, 4 parts of phenyltrimethoxysilane, and 0.1 part of hexamethyldisilazane was then poured over the surface of the silica and the mixer closed and started. After about 15 minutes mixing, a nitrogen purge was applied to the mixer contents to remove evolved methanol and to fill the mixer with an inert gas to prevent any possibility of an explosive mixture forming. After mixing an additional 30 minutes, the mixer was stopped and the treated filler was removed and stored.

A silicone elastomer base was then prepared by adding 90.1 parts of dimethylvinylsiloxy endblocked polydimethylsiloxane having a Williams Plasticity Number of about 150 and 10.04 parts of dimethylvinylsiloxy endblocked polydiorganosiloxane having about 98 mol percent dimethylsiloxane units and 2 mol percent methylvinylsiloxane units and a Williams Plasticity Number of about 150 to a sigma blade mixer. Then 5 parts of hydroxyl endblocked polydimethylsiloxane fluid having a viscosity of about 0.04 Pa.s at 25° C. and about 4 weight percent silicon-bonded hydroxyl radicals was mixed in. Steam to heat the mixer was then turned on and about 10.6 parts of the above treated filler was added. After the filler was massed with the polymer to give a smooth mix another 10.6 parts of filler was added and mixed until massed. A total of four filler additions were made, giving a total of 42.2 parts of the treated filler. After all of the filler was massed the contents were placed under a full vacuum for about 10 minutes to remove any volatiles present, then the mixer was opened and allowed to cool. After cooling to room temperature, about 4.3 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent was added along with about 2.3 parts of the treated filler. The mixture was mixed at room temperature until uniform to give a silicone elastomer base, sample 1.

The silicone elastomer base, sample 1, was then catalyzed by mixing 100 parts of base and 1 part of catalyst of 50 percent 2,5 bis(tert-butylperoxy)-2,5-dimethyl hexane in powdered carrier on a two roll mill. The catalyzed silicone elastomer was then molded into test sheets about 0.075 inches (1.9 millimeters) thick by molding in a press and curing for 10 minutes at 340° F. (171° C.). A part of the sheets were then postcured for 4 hours at 392° F. (200° C.). The test sheets were cut into samples and tested for physical properties in accordance with ASTM D 2240 for durometer, ASTM D 412 for tensile strength and elongation at break and ASTM D 395 for compression set after 22 hours at 350° F. (177° C.). Samples were also heat aged for 70 hours at 435° F. (225° C.) and tested. Table 1 shows the test results with the heat aging results being the points lost for durometer and the percent lost for the tensile strength and elongation.

A treated filler not falling under the claims of this invention was prepared as above, but the treating agent mixture consisted of 2 parts of vinyltrimethoxysilane, 4 parts of methyltrimethoxysilane, and 0.1 part of hexamethyldisilazane.

This treated filler was used to make a silicone elastomer base and sample 2 in the same manner as above. The test results on this comparative elastomer are given in Table I The test results of Table I show that the filler treated with the combination of vinyltrimethoxysilane and phenyltrimethoxysilane gave improved properties as compared to filler treated with a combination of vinyltrimethoxysilane and methyltrimethoxysilane.

TABLE I

| Sample | 1 | | 2* | |
|---|---|---|---|---|
| Cure | press | post | press | post |
| Durometer, Shore A | 62 | 65 | 62 | 67 |
| Tensile Strength, psi | 1396 | 1330 | 1441 | 1404 |
| Elongation, psi | 703 | 620 | 704 | 635 |
| Compression set, % | 30 | 20 | 40 | 22 |
| After heat aging | | | | |
| Durometer change | 3 | 0 | 13 | 6 |
| Tensile change, % | −63 | −61 | −64 | −62 |
| Elongation change, % | −70 | −64 | −88 | −85 |

*comparative example

EXAMPLE 2

A comparative silicone elastomer base was prepared in which the filler was treated in situ. This was a known method of producing a high strength silicone rubber base.

First 90.1 parts of dimethylvinylsiloxy endblocked polydimethylsiloxane having a Williams Plasticity Number of about 150 and 10.04 parts of dimethylvinylsiloxy endblocked polydiorganosiloxane having about 98 mol percent dimethylsiloxane units and 2 mol percent methylvinylsiloxane units and a Williams Plasticity Number of about 150 were added to a sigma blade mixer. Then 0.48 part of hydroxyl endblocked polymethylvinylsiloxane having about 4 weight percent hydroxyl radical, 7.94 part of hexamethyldisilazane, and 0.96 part of water was mixed in. Steam to heat the mixer was then turned on and about 10.0 parts of the filler used to prepare the treated filler of Example 1 was added. After the filler was massed with the polymer to give a smooth mix another 10.0 parts of filler was added and mixed until massed. A total of four filler additions were made, giving a total of 39.8 parts of the filler. This is the same amount of filler as used in sample 1 since this filler did not have treating agent attached to it as it was added. After all of the filler was massed, the contents were placed under a full vacuum for about 10 minutes to remove any volatiles present, then the mixer was opened and allowed to cool. After cooling to room temperature, about 4.3 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent was added along with about 2.3 parts of the untreated filler. The mixture was mixed at room temperature until uniform to give a silicone elastomer base, sample 3.

The silicone elastomer base, sample 3, was then catalyzed, molded and tested in the same manner as in Example 1, with the results shown in Table II.

The comparative sample 3 shows properties similar to the comparative sample 2 above which also had a combination of methyl and vinyl treatment on the filler. The improvement in properties on compression set and heat aging, particularly retention of elongation by the sample 1 using the treated filler of this invention is shown.

TABLE II

| Sample | 3* | | 1 | |
|---|---|---|---|---|
| Cure | press | post | press | post |
| Durometer, Shore A | 58 | 62 | 62 | 65 |
| Tensile Strength, psi | 1525 | 1588 | 1396 | 1330 |
| Elongation, psi | 790 | 673 | 703 | 620 |
| Compression set, % | 43 | 33 | 30 | 20 |
| After heat aging | | | | |
| Durometer change | 16 | 9 | 3 | 0 |
| Tensile change, % | −62 | −67 | −63 | −61 |
| Elongation change, % | −90 | −89 | −70 | −64 |

*comparative example

EXAMPLE 3

In order to evaluate the effect of differing amounts of vinyl and phenyl containing treating agents used to form the treated filler, a designed experiment was conducted in which the amounts and kinds of treating agents used were varied. The samples designated by the experiment were then produced and tested in the same manner as in Example 1. The results were then entered into a computer program and graphs showing the expected results of varying the ingredients were developed. By selecting the appropriate points from the graphs, comparative data can be developed to illustrate the effect of various changes in the treating agent formulation. Illustrative mixtures and the results predicted from the experiment are shown in Table III. In the table, VTM is vinyltrimethoxysilane, PhTM is phenyltrimethoxysilane, and MTM is methyltrimethoxysilane. In each case the treating agent mixture contains 0.1 part of hexamethyldisilazane to catalyze the treating process.

A comparison of sample 1, an actual example, and sample 4, a calculated example, show that the designed experiment calculates results that are close to that actually obtained. A comparison of sample 5 with sample 4 shows that the vinyl alone does not result in as good a retention of elongation upon heat aging as when the combination of both vinyl and phenyl are present on the filler. A comparison of sample 5 and sample 6 shows that when 1 part of the vinyl is replaced with 1 part of phenyl, the improvement in heat aging is not significant. A comparison of sample 7 with 6 shows that the additional phenyl in 7 gives improved heat aging, and that the reduction in vinyl gives poorer compression set results. A comparison of sample 5 to sample 8 shows that the addition of the methyl to the vinyl does not change the properties, neither of these samples falls under the claims of this invention. A comparison of sample 6 to sample 9 shows that the addition of methyl does not change the results obtained. A comparison of sample 7 to sample 10 shows the same.

TABLE III

| Sample | 1 | | 4+ | | 5+* | | 6+ | |
|---|---|---|---|---|---|---|---|---|
| VTM, parts | 2 | | 2 | | 3 | | 2 | |
| PhTM, parts | 4 | | 4 | | 0 | | 1 | |
| MTM, parts | 0 | | 0 | | 0 | | 0 | |
| Cure | press | post | press | post | press | post | press | post |
| Durometer, Shore A | 62 | 65 | 61 | 65 | 66 | 67 | 64 | 66 |
| Tensile Strength, psi | 1396 | 1330 | 1398 | 1360 | 1379 | 1360 | 1418 | 1410 |
| Elongation, psi | 703 | 620 | 695 | 598 | 666 | 598 | 695 | 628 |
| Compression set, % | 30 | 20 | 35 | 21 | 35 | 22 | 37 | 24 |
| After heat aging | | | | | | | | |
| Durometer change | 3 | 0 | 6 | 1 | 7 | 6 | 6 | 3 |
| Tensile change, % | −63 | −61 | −64 | −61 | −64 | −64 | −66 | −66 |
| Elongation change, % | −70 | −64 | −75 | −67 | −85 | −85 | −83 | −82 |

| Sample | 7+ | | 8+* | | 9+ | | 10+ | |
|---|---|---|---|---|---|---|---|---|
| VTM, parts | 1 | | 3 | | 2 | | 1 | |
| PhTM, parts | 2 | | 0 | | 1 | | 2 | |
| MTM, parts | 0 | | 4 | | 4 | | 4 | |
| Cure | press | post | press | post | press | post | press | post |
| Durometer, Shore A | 61 | 65 | 64 | 67 | 61 | 67 | 58 | 64 |
| Tensile Strength, psi | 1437 | 1360 | 1418 | 1311 | 1456 | 1410 | 1437 | 1410 |
| Elongation, psi | 754 | 658 | 666 | 598 | 695 | 628 | 754 | 688 |
| Compression set, % | 40 | 27 | 35 | 24 | 37 | 21 | 44 | 21 |
| After heat aging | | | | | | | | |
| Durometer change | 6 | 2 | 11 | 6 | 10 | 4 | 9 | 4 |
| Tensile change, % | −66 | −66 | −63 | −61 | −65 | −64 | −66 | −66 |
| Elongation change, % | −80 | −76 | −88 | −85 | −85 | −82 | −82 | −79 |

*comparative example
+ calculated results from designed experiment

EXAMPLE 4

A treated filler was prepared as in Example 1, but using 6 parts of vinyltrimethoxysilane and 8 parts of phenyltrimethoxysilane.

A silicone elastomer base was then prepared by adding 50 parts of polydiorganosiloxane gum having about 0.14 mol percent vinyl radicals and the rest methyl radicals with dimethylvinylsiloxy endblockers and a Williams Plasticity Number of about 150 and 50 parts of polydiorganosiloxane gum having about 0.57 mol percent vinyl radicals and the rest methyl radicals with dimethylvinylsiloxy endblockers and a Williams Plasticity Number of about 150 to a sigma blade mixer. Then 8 parts of hydroxyl endblocked polydimethylsiloxane fluid having a viscosity of about 0.04 Pa.s at 25° C. and about 4 weight percent silicon-bonded hydroxyl radicals was mixed in along with 1.75 parts of magnesium oxide additive. Steam to the mixer was turned on and about 11 parts of the above treated filler was added and mixed until uniform. Additional portions of filler were added in the same manner until a total of 51.3 parts of treated silica had been added. The contents were placed under a full vacuum for about 10 minutes to remove any volatiles present, then the mixer was opened and allowed to cool to room temperature. Then 78 parts of ground quartz having an average particle size of about 5 micrometers was added and mixed until uniform.

The silicone elastomer base, sample 11, was then catalyzed by mixing 100 parts of base and 1 part of catalyst of 50 percent 2,5 bis(tert-butylperoxy)-2,5-dimethylhexane in powdered carrier on a two roll mill. The catalyzed silicone elastomer was then molded and tested as in Example 1, with the results shown in Table IV.

A similiar treated filler was prepared as above, but using 8 parts of the vinyltrimethoxysilane and 6 parts of the phenyltrimethoxysilane. A silicone elastomer base, sample 12, was then prepared in the same manner as above and tested, with the results shown in Table IV.

Also shown in Table IV are results from testing a commercial silicone rubber intended for the same use as these samples and prepared from the same mixture of polymers, sample 13, but containing 45 parts of untreated filler, 78 parts of the ground quartz, and about 7 parts of an additive of benzene soluble organopolysiloxane having 37.5 mol percent monophenylsiloxane units, 30 mol percent dimethylsiloxane units, 20 mol percent methylvinylsiloxane units, 7.5 mol percent monomethylsiloxane units and 5 mol percent trimethylsiloxy units with a phenyl content of about 5.5 weight percent and a hydroxyl content of about 2.25 weight percent.

TABLE IV

| Sample | 11 | | 12 | | 13* | |
|---|---|---|---|---|---|---|
| VTM, parts | 6 | | 8 | | 0 | |
| PhTM, parts | 8 | | 6 | | 0 | |
| Cure | press | post | press | post | press | post |
| Durometer, Shore A | 83 | 83 | 84 | 86 | 83 | 85 |
| Tensile Strength, psi | 1127 | 1160 | 1039 | 1201 | 1078 | 1132 |
| Elongation, psi | 80 | 75 | 69 | 71 | 106 | 99 |
| Compression set, % | 17 | 12 | 14 | 12 | 17 | 20 |
| After heat aging | | | | | | |
| Durometer change | 2 | 3 | 4 | 0 | 4 | 2 |
| Tensile change, % | −7 | −4 | −3 | −25 | −6 | −12 |
| Elongation change, % | −25 | −9 | −13 | −28 | −37 | −38 |

*comparative example

EXAMPLE 5

A comparative treated filler was prepared as in Example 1, but using 0.2 part of vinyltrimethoxysilane and 10 parts of methyltrimethoxysilane. This is a comparative example because there is no phenyl containing treating agent present.

This treated filler was used to prepare a silicone elastomer base, sample 14, by mixing 95 parts of dimethylvinylsiloxy endblocked polydimethylsiloxane having a Williams Plasticity Number of about 150, 5 parts of dimethylvinylsiloxy endblocked polydiorganosiloxane having about 98 mol percent dimethylsiloxane units and 2 mol percent methylvinylsiloxane units and a Williams Plasticity Number of about 150, and 1 part of dimethylvinylsiloxy endblocked copolymer of 78 mol percent dimethlysiloxane units and 22 mol percent of methylvinylsiloxane units having about 7.7 weight percent vinyl radicals and a viscosity of from 8 to 25 Pa.s at 25° C. in a sigma blade mixer along with 4 parts of hydroxyl endblocked polydimethylsiloxane fluid having a viscosity of about 0.04 Pa.s at 25° C. and about 4 weight percent silicon-bonded hydroxyl radicals. Then 32 parts of the above treated filler and 0.02 part of manganese octoate was mixed in until a uniform base was obtained as in Example 1.

Then 100 parts of the base was mixed with 1.3 parts of catalyst paste of 50 percent 2,4-dichlorobenzoyl peroxide in polydiorganosiloxane fluid (Cadox TS-50) and the catalyzed stock was molded 5 minutes at 240° F. (116° C.) and postcured for 4 hours at 392° F. (200° C.), then tested as in Example 1 with the results shown in Table V. Another 100 parts of the base was mixed with 1 part of catalyst of 50 percent 2,5 bis(tert-butylperoxy)-2,5-dimethyl hexane in powdered carrier (Varox) and molded and postcured for 4 hours at 392° F. (200° C.), then tested as in Example 1 with the results shown in Table V.

A treated filler, treated according to this invention, was prepared as in Example 1, but using 0.2 part of vinyltrimethoxysilane and 10 parts of phenyltrimethoxysilane.

This treated filler was used to prepare a silicone elastomer base, sample 15, by preparing a base in the same manner as above for sample 14, except it also contained 0.2 parts of hydroxyl endblocked polydiorganosiloxane having methyl and vinyl radicals and having about 10 weight percent vinyl radical and about 16 weight percent hydroxyl radical. The results are shown in Table V. The results show that the combination of vinyltrimethoxysilane and phenyltrimethoxy silane as treating agent produced a cured silicone elastomer having lower compression set and lower loss of properties on heat aging than was the case when methyltrimethoxysilane and vinyltrimethoxysilane were used as treating agents.

Another set of similar comparisons was prepared. Treated silica was prepared as above using 0.5 part of vinyltrimethoxysilane and 10 parts of phenyltrimethoxysilane.

This treated filler was used to prepare a silicone elastomer base, sample 16, by mixing 92.5 parts of dimethylvinylsiloxy endblocked polydimethylsiloxane having a Williams Plasticity Number of about 150, 7.5 parts of dimethylvinylsiloxy endblocked polydiorganosiloxane having about 98 mol percent dimethylsiloxane units and 2 mol percent methylvinylsiloxane units and a Williams Plasticity Number of about 150, and 2 parts of dimethylvinylsiloxy endblocked copolymer of 78 mol percent dimethylsiloxane units and 22 mol percent of methylvinylsiloxane units having about 7.7 weight percent vinyl radicals and a viscosity of from 8 to 25 Pa.s at 25° C. in a sigma blade mixer along with 8 parts of hydroxyl endblocked polydimethylsiloxane fluid having a viscosity of about 0.04 Pa.s at 25° C. and about 4 weight percent silicon-bonded hydroxyl radicals. Then 50 parts of the above treated filler and 0.02 part of manganese octoate was mixed in until a uniform base was obtained as in Example 1.

Then 100 parts of the base was mixed with 1.3 parts of catalyst paste of 50 percent 2,4-dichlorobenzoyl peroxide in polydiorganosiloxane fluid (Cadox TS-50) and the catalyzed stock was molded 5 minutes at 240° F. (116° C.) and postcured for 4 hours at 392° F. (200° C.), then tested as in Example 1 with the results shown in Table V. Another 100 parts of the base was mixed with 1 part of catalyst of 50 percent 2,5 bis(tert-butylperoxy)-2,5-dimethyl hexane in powdered carrier (Varox) and molded and postcured for 4 hours at 392° F. (200° C.), then tested as in Example 1 with the results shown in Table V.

A comparative treated filler was prepared as in Example 1, but using 1.0 part of vinyltrimethoxysilane and 9 parts of methyltrimethoxysilane.

This treated filler was used to prepare a silicone elastomer base, sample 17, by preparing a base in the same manner as above for sample 14, except it did not contain the dimethylvinylsiloxy endblocked copolymer. The results are shown in Table V. The results show that the combination of vinyltrimethoxysilane and phenyltrimethoxy silane as treating agent produced a cured silicone elastomer with lower loss of properties on heat aging than was the case when methyltrimethoxysilane and vinyltrimethoxysilane were used as treating agent. Also shown in Table V are results from testing a commercial silicone rubber, sample 18, intended for the same use as samples 16 and 17 that was prepared from 100 parts of dimethylvinylsiloxy endblocked polydimethylsiloxane having a Williams Plasticity Number of about 150, 3 parts of dimethylvinylsiloxy endblocked copolymer of 78 mol percent dimethylsiloxane units and 22 mol percent of methylvinylsiloxane units having about 7.7 weight percent vinyl radicals and a viscosity of about 15 Ps.s at 25° C., 1 part of hydroxyl endblocked polydimethylsiloxane fluid having a viscosity of about 0.04 Pa.s at 25° C. and about 4 weight percent silicon-bonded hydroxyl radicals, 10 parts of hexamethyldisilazane and 5 parts of water added to in situ treat the 50 parts of silica filler. This commercial silicone rubber also contained 0.5 part of ceric hydrate powder, a known additive for improving heat resistance. This base was catalyzed, molded and tested as in Example 1 with the results shown in Table V. Sample 15, made with only 32 parts of the treated silica of this invention showed the same range of durometer as the commercial product having 50 parts of silica filler. This composition 15 showed lower compression set and lower loss of elongation upon heat aging than was found with the commercial product, even though the commercial product contained a heat stability additive not present in the experimental product.

TABLE V

| Sample | 14* | | 15 | | 16 | | 17* | | 18* | |
|---|---|---|---|---|---|---|---|---|---|---|
| VTM, parts | 0.2 | | 0.2 | | 0.5 | | 1 | | 0 | |
| PhTM, parts | 0 | | 10 | | 10 | | 0 | | 0 | |
| MTM, parts | 10 | | 0 | | 0 | | 9 | | 0 | |
| Catalyst | TS-50 | Varox | TS-50 | Varox | TS-50 | Varox | TS-50 | Varox | TS-50 | Varox |
| Durometer, Shore A | 52 | 53 | 47 | 53 | 70 | 74 | 68 | 74 | 56 | 59 |
| Tensile Strength, psi | 1326 | 1374 | 1277 | 1248 | 1396 | 1312 | 1446 | 1404 | 1563 | 1397 |
| Elongation, psi | 461 | 573 | 507 | 503 | 595 | 471 | 538 | 463 | 645 | 658 |
| Compression set, % | 38 | 33 | 33 | 23 | 49 | 34 | 34 | 25 | 40 | 37 |

TABLE V-continued

| Sample | 14* | 15 | 16 | 17* | 18* | | | | |
|---|---|---|---|---|---|---|---|---|---|
| After heat aging, 70 hours at 392° F. (200° C.) | | | | | | | | | |
| Durometer change | 3 | 5 | 0 | 1 | 3 | 3 | 3 | 1 | 6 | 6 |
| Tensile change, % | −37 | −25 | −18 | −15 | −6 | +7 | −28 | −23 | −21 | −6 |
| Elongation change, % | −34 | −30 | −15 | −14 | −21 | −6 | −31 | −25 | −42 | −34 |

*comparative example

That which is claimed is:

1. An improved reinforcing silica filler having a surface area of greater than 50 m²/g, said surface having been treated by mixing 100 parts by weight of silica, having from 0.5 to 6 parts by weight of adsorbed moisture, with a treating mixture comprising from 1 to 30 parts by weight of volatile treating agent of the formula $R_xSi(OR')_{4-x}$, wherein R is a alkyl, alkenyl, or aryl radical having from 1 to 6 carbon atoms which may be substituted with halogen atoms, R' is an alkyl radical having from 1 to 3 carbons atoms, x is 1 or 2, and R and R' are chosen so that the vapor pressure of the alkoxysilane equals or exceeds 0.0001 atmosphere at treatment temperature, for a period of time sufficient to allow the desired amount of treating agent to be adsorbed onto the surface of the particulate filler, wherein the volatile treating agent comprises a combination of from 0.2 to 10 parts by weight of volatile treating agent of the formula $Vi_xSi(OR')_{4-x}$ and from 0.2 to 15 parts by weight of volatile treating agent of the formula $Ph_xSi(OR')_{4-x}$, where Vi is vinyl radical and Ph is phenyl radical.

2. The improved reinforcing silica filler of claim 1 in which the treating mixture also contains from 0.001 to 5.0 parts by weight of volatile catalyst selected from the group consisting of base B and mixtures of acid A and base B, wherein acid A is a volatile acid or acid progenitor, and base B is a silylamine or silazane, acid A and base B being chosen so that the vapor pressure of either acid A or base B exceeds 0.005 atmosphere at treatment temperature.

3. The improved reinforcing silica filler of claim 1 wherein the volatile treating agent also includes alkoxy silane of the formula $R_xSi(OR')_{4-x}$, wherein R is methyl radical.

4. The improved reinforcing silica filler of claim 2 in which the volatile treating agent comprises a combination of from 0.5 to 6 parts by weight of volatile treating agent of the formula $Vi_xSi(OR')_{4-x}$ and from 1 to 10 parts by weight of volatile treating agent of the formula $Ph_xSi(OR')_{4-x}$.

5. A silicone composition comprising a polydiorganosiloxane and the treated filler of claim 1.

6. The silicone composition of claim 5 in which the polydiorganosiloxane has a viscosity of greater than 1000 Pa.s at 25° C. and which also includes a curing means.

7. In a method of rapidly treating the surface of reinforcing silica filler consisting essentially of mixing, at a temperature of from about −10° to 130° C., (A) 100 parts by weight of reinforcing silica filler, having a surface area of greater than 50 m²/g, and having from 0.5 to 6 parts by weight of adsorbed moisture, with a treating mixture comprising (B) from 1 to 30 parts by weight of volatile treating agent of the formula $R_xSi(OR')_{4-x}$, wherein R is a alkyl, alkenyl, or aryl radical having from 1 to 6 carbon atoms which may be substituted with halogen atoms, R' is an alkyl radical having from 1 to 3 carbon atoms, x is 1 or 2, and R and R' are chosen so that the vapor pressure of the alkoxysilane equals or exceeds 0.0001 atmosphere at treatment temperature, for a period of time sufficient to allow the desired amount of treating agent to be adsorbed onto the surface of the particulate filler, the improvement consisting of the use of volatile treating agent comprising a combination of from 0.2 to 10 parts by weight of volatile treating agent of the formula $Vi_xSi(OR')_{4-x}$, and from 0.2 to 15 parts by weight of volatile treating agent of the formula $Ph_xSi(OR')_{4-x}$, where Vi is vinyl radical and Ph is phenyl radical, to yield a filler which requires a minimum of energy to disperse rapidly into polydiorganosiloxane and which gives improved properties to cured silicone elastomers.

8. The method of claim 7 in which the volatile treating agent also includes alkoxy silane of the formula $R_xSi(OR')_{4-x}$, wherein R is methyl radical.

9. A silicone composition comprising a polydiorganosiloxane and a treated silica filler produced by the method of claim 7.

10. The method of claim 7 in which the treating mixture also contains (C) from 0.001 to 5.0 parts by weight of volatile catalyst selected from the group consisting of base B and mixtures of acid A and base B, wherein acid A is a volatile acid or acid progenitor, and base B is a silylamine or silazane, acid A and base B being chosen so that the vapor pressure of either acid A or base B exceeds 0.005 atmosphere at treatment temperature.

11. In a method of rapidly treating the surface of reinforcing silica filler consisting essentially of mixing, at a temperature of from about −10° to 130° C., (A) 100 parts by weight of reinforcing silica filler, having a surface area of greater than 50 m²/g, and having from 0.5 to 6 parts by weight of adsorbed moisture, (B) from 1 to 30 parts by weight of volatile treating agent of the formula $R_xSi(OR')_{4-x}$, wherein R is a alkyl, alkenyl, or aryl radical having from 1 to 6 carbon atoms which may be substituted with halogen atoms, R' is an alkyl radical having from 1 to 3 carbon atoms, x is 1 or 2, and R and R' are chosen so that the vapor pressure of the alkoxysilane equals or exceeds 0.0001 atmosphere at treatment temperature, (C) from 0.001 to 5.0 parts by weight of volatile catalyst selected from the group consisting of base B and mixtures of acid A and base B, wherein acid A is a volatile acid or acid progenitor, and base B is a silylamine or silazane, acid A and base B being chosen so that the vapor pressure of either acid A or base B exceeds 0.005 atmosphere at treatment temperature, for a period of time sufficient to allow the desired amount of treating agent to be adsorbed onto the surface of the particulate filler, the improvement consisting of the use of volatile treating agent consisting of a combination of from 0.2 to 10 parts by weight of volatile treating agent of the formula $Vi_xSi(OR')_{4-x}$, and from 0.2 to 15 parts by weight of volatile treating agent of the formula $Ph_xSi(OR')_{4-x}$, where Vi is vinyl radical and Ph is phenyl radical, to yield a filler which requires a minimum of energy to disperse rapidly into polydiorganosiloxane and which gives improved properties to cured silicone elastomers.

* * * * *